US009757786B2

United States Patent
Hashimoto et al.

(10) Patent No.: US 9,757,786 B2
(45) Date of Patent: Sep. 12, 2017

(54) DIE APPARATUS AND MANUFACTURING METHOD OF METAL PRODUCT USING DIE APPARATUS

(71) Applicant: MITSUI HIGH-TEC, INC., Kitakyushu-shi, Fukuoka (JP)

(72) Inventors: Akihiro Hashimoto, Fukuoka (JP); Kenichirou Iwata, Fukuoka (JP)

(73) Assignee: MITSUI HIGH-TEC, INC., Fukuoka (JP)

( * ) Notice: Subject to any disclaimer, the term of this patent is extended or adjusted under 35 U.S.C. 154(b) by 0 days.

(21) Appl. No.: 15/003,093

(22) Filed: Jan. 21, 2016

(65) Prior Publication Data

US 2016/0243605 A1    Aug. 25, 2016

(30) Foreign Application Priority Data

Feb. 20, 2015 (JP) ................. 2015-031655

(51) Int. Cl.
*B21D 28/14* (2006.01)
*B21D 28/22* (2006.01)
*H02K 15/00* (2006.01)

(52) U.S. Cl.
CPC ............. *B21D 28/14* (2013.01); *B21D 28/22* (2013.01); *H02K 15/00* (2013.01)

(58) Field of Classification Search
CPC ........ B21D 28/02; B21D 28/04; B21D 28/10; B21D 28/14; B21D 28/26; B21D 28/265; B21D 28/22; B21D 22/02; B21D 24/005

USPC .......................................... 72/405.06–405.08
See application file for complete search history.

(56) References Cited

U.S. PATENT DOCUMENTS 2,163,229 A       6/1939 Knebel
RE24,439 E  *    3/1958 Banko .................. B21D 28/14
                                                      83/685

FOREIGN PATENT DOCUMENTS

| CA | 2695101 | 10/2012 |
|----|---------|---------|
| CN | 101905268 | 12/2010 |
| CN | 202725743 | 2/2013 |
| CN | 203695772 | 7/2014 |
| JP | 61-49635 | 3/1986 |
| JP | 6-22375 | 3/1994 |
| JP | 6-276712 | 9/1994 |
| JP | 11-164527 | 6/1999 |

OTHER PUBLICATIONS

Office Action issued in China Counterpart Patent Appl. No. 201610096656.7, dated Jul. 21, 2017, along with an English translation thereof.

* cited by examiner

*Primary Examiner* — Debra Sullivan
(74) *Attorney, Agent, or Firm* — Greenblum & Bernstein, P.L.C.

(57) ABSTRACT

A die apparatus includes a first die and a second die which are respectively used in adjacent working stations that sequentially blank or stamp out a progressively fed thin metal sheet. The first and second dies are held in a state where outer peripheral surfaces of the first and second dies directly contact each other.

9 Claims, 5 Drawing Sheets

DIE APPARATUS AND MANUFACTURING METHOD OF METAL PRODUCT USING DIE APPARATUS

CROSS REFERENCE TO RELATED APPLICATION(S)

This application is based upon and claims the benefit of priority of Japanese Patent Application No. 2015-31655 filed on Feb. 20, 2015, the contents of which are incorporated herein by reference in its entirety.

BACKGROUND OF THE INVENTION

1. Field of the Invention

The present invention relates to a die apparatus, a blanking or stamping speed of which is improved for the purpose of a miniaturization and a manufacturing method of a metal product using the die apparatus.

2. Description of the Related Art

A laminated iron core (one example of a metal product) which forms respectively a rotor or a stator of an electric motor is manufactured in such a way that a thin electromagnetic steel plate (one example of a thin metal sheet) is blanked or stamped out to a prescribed configuration by using a press line (a die apparatus having a plurality of working stations which progressively feed the thin electromagnetic steel plate at prescribed feed pitches and sequentially blank or stamp out the thin electromagnetic steel plate), and a prescribed number of iron core pieces thus formed are laminated and fastened and connected together by a method of caulking or welding.

Here, since the iron core piece is formed in such a way that an inner configuration is blanked or stamped out (a blanking work of an inner peripheral side) and then, an outer configuration is blanked or stamped out, as shown in FIGS. 4A and 4B, the feed pitch P of the thin electromagnetic steel plate is set to an outside diameter of the iron core piece. Further, an idle process (a process that the blanking work is not carried out) is provided between an inner configuration blanking process and an outer configuration blanking process to separate a position where an inner configuration blanking die 81 is press fitted from a position where an outer configuration blanking die 82 is press fitted in a die plate 80. Thus, the die plate 80 which holds the inner configuration blanking die 81 and the outer configuration blanking die 82 integrally is allowed to have a rigidity (a strength) so that the die plate 80 is prevented from being deformed to deteriorate a holding power by the press fitted inner and outer configuration blanking dies 81 and 82 (for instance, see JP-B-6-22375, JP-A-6-276712 and JP-A-11-164527 as Patent Literatures 1 to 3).

Patent Literature 1: JP-B-6-22375
Patent Literature 2: JP-A-6-276712
Patent Literature 3: JP-A-11-164527

SUMMARY OF THE INVENTION

In recent years, in order to improve a performance of the electric motor, a problem arises that a laminated iron core having a more complicated configuration increases and a blanking or stamping layout of the laminated iron core becomes longer in accordance with the increase of blanking processes. Especially, in the electric motor to be mounted on a vehicle, since there are many laminated iron cores having not only the complicated configurations, but also large outside diameters, the problem more obviously arises that the blanking or stamping layouts of the laminated iron cores become longer. Accordingly, a problem appears that a die apparatus is enlarged, so that a production cost of the die apparatus increases. Further, when a press apparatus is small which is connected to the die apparatus and allows the die apparatus to carry out a blanking or stamping operation, a problem arises that the die apparatus cannot be mounted on the press apparatus (the die apparatus cannot be built in the press apparatus). Further, when the die apparatus is enlarged, since the weight of an upper die of the die apparatus also creases, a problem arises that the blanking or stamping speed cannot be increased.

Thus, when the idle process which is provided between the inner configuration blanking process and the outer configuration blanking process is supposed to be removed so that the position where the inner configuration blanking die 81 is press fitted and the position where the outer configuration blanking die 82 is press fitted are allowed to come close to each other within a range that the rigidity of a die plate 83 which holds integrally the inner and outer configuration blanking dies 81 and 82 is not deteriorated, as shown in FIG. 5A, a problem arises that a center distance P' between the inner configuration blanking die 81 and the outer configuration blanking die 82 cannot be probably allowed to correspond to the feed pitch P of the electromagnetic steel plate. Thus, the electromagnetic steel plate cannot be progressively fed.

On the other hand, as shown in FIG. 5B, even when the idle process which is provided between the inner configuration blanking process and the outer configuration blanking process is removed so that the center distance between the inner configuration blanking die 81 and the outer configuration blanking die 82 may be allowed to correspond to the feed pitch P of the electromagnetic steel plate, a problem arises that a clearance C between the inner and outer configuration blanking dies 81 and 82 becomes small, so that a die plate 84 which holds integrally the inner and outer configuration blanking dies 81 and 82 cannot be probably allowed to have the rigidity. Thus, the inner and outer configuration blanking dies 81 and 82 cannot be highly accurately held in the die plate 84. Then, in the worst case, a problem arises that during the blanking work, the die plate 84 is broken (cracks are generated in the clearance C).

The present invention is devised by considering the above-described circumstances, and it is a non-limited object of one or more aspects of the present invention to provide a die apparatus which can reduce a production cost and improve a blanking or stamping speed by a miniaturization and a manufacturing method of a metal product using the die apparatus.

A first aspect of the present invention provides a die apparatus including: a first die and a second die which are respectively used in adjacent working stations that sequentially blank or stamp out a progressively fed thin metal sheet, wherein the first and second dies are held in a state where outer peripheral surfaces of the first and second dies directly each other.

In a non-limited example in which the outer peripheral surfaces of the first and second dies directly contact each other, one of the first and second dies has a circular outer configuration. The other of the first and second dies has an outer configuration in which a part of a circular form is cut out to a configuration along the other side outline, namely, along a side outline of the one die in a boundary between the first and second dies.

The die apparatus may further include a die plate which holds the first and second dies, wherein the die plate includes first and second receiving parts in which the first and second dies are respectively received, and the first and second receiving parts are continuous through a communicating part in which the first and second dies contact each other.

The die apparatus may be configured so that the die plate is larger in thickness than the first and second dies.

The die apparatus may be configured so that the first and second receiving parts of the die plate are formed as first and second recessed parts recessed in an upper surface side of the die plate, the die plate includes first and second ejection parts in a lower surface side of the first and second recessed parts, and the first and second ejection parts have first and second seat surfaces which abut on and support lower surfaces of the first and second dies press fitted to the first and second recessed parts, and first and second through holes formed in central parts and respectively communicated with inside space parts of the first and second dies press fitted to the first and second recessed parts to pass blanked pieces ejected from the inside space parts of the first and second dies through the first and second through holes.

For a non-limited example, the thickness of a die plate is set to 1.1 to 2.5 times as large as the thickness of the first and second dies. When the thickness of the die plate is smaller than 1.1 times as thick as the thickness of the first and second dies, the rigidity of the die plate cannot be obviously restrained from being deteriorated. On the other hand, when the thickness of the die plate exceeds and is larger than a thickness 2.5 times as large as the thickness of the first and second dies, the rigidity of the die plate is improved, but the weight of the die plate is increased. Thus, a material cost undesirably rises.

The die apparatus may be configured so that the first ejection part is formed integrally with the die plate and a part of the first ejection part provided between the first and second through holes forms a rib of the die plate.

Alternatively, the die apparatus may be configured so that the first and second ejection parts are respectively formed integrally with the die plate, and parts of the first and second ejection parts provided between the first and second through holes form a rib of the die plate.

Since the rib is formed between the first and second through holes, the rigidity of the die plate can be more restrained from being deteriorated, the first and second dies can be highly accurately held in the die plate and the thickness of the die plate can be also reduced.

The die apparatus may be configured so that the second ejection part is detachable from the die plate and attachable in a through part having a same section as that of the second recessed part.

Since the above-described structure is formed, the structure of the die plate can be simplified and a manufacturing cost of the die plate (a manufacturing cost of a die) can be reduced.

The die apparatus may be configured so that the first die is an inner configuration blanking die used in an inner configuration blanking or stamping work of an iron core piece from the thin metal sheet, the first through hole is a scrap ejection hole through which scraps ejected from the inner configuration blanking die pass, the second die is an outer configuration blanking die used in an outer configuration blanking or stamping work of the iron core piece from the thin metal sheet, the second through hole is a product ejection hole through which the iron core pieces ejected from the outer configuration blanking die pass, and the scrap ejection hole has a circular or non-circular form in its inner peripheral side. Thus, the iron core piece can be manufactured which has a desired form in the inner peripheral side.

A second aspect of the present invention provides a manufacturing method of a metal product using the die apparatus in the first aspect of the present invention.

In the die apparatus according to the first aspect of the present invention, since an idle process is removed to shorten a blanking or stamping process, a lower die of the die apparatus can be miniaturized. As a result, since an upper die of the die apparatus is miniaturized, a blanking or stamping speed of a press apparatus can be improved, and a productivity of the blanking or stamping process can be improved.

In the manufacturing method, of the metal product according to the second aspect of the present invention, since the die apparatus having high productivity is used, the production cost of the metal product can be reduce

DETAILED DESCRIPTION OF THE EXEMPLARY EMBODIMENTS

Subsequently, by referring to the accompanying drawings, exemplary embodiments which embody the present invention will be described below to understand the present invention.

Figure 1A:
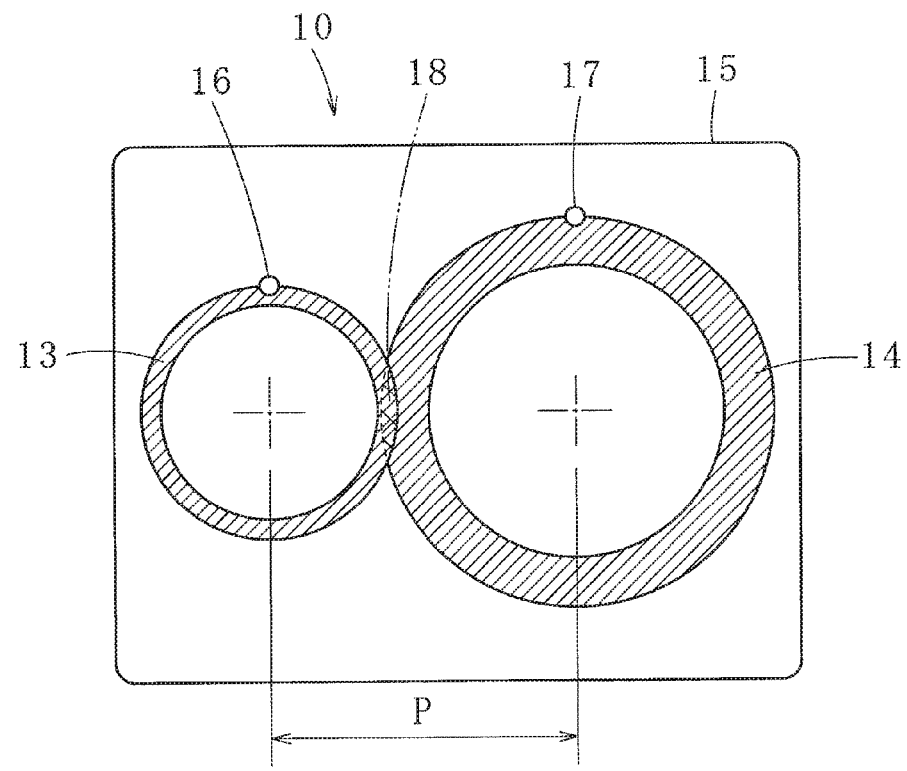
FIG. 1A is a plan view of a die plate which holds dies adjacent to each other under a surface-contact state in a die apparatus according to a first exemplary embodiment of the present invention.

As shown in FIG. 1A, a die apparatus 10 according to a first exemplary embodiment of the present invention sequentially blanks or stamps out a thin electromagnetic steel plate 11 (see FIG. 3) as one example of a progressively fed thin metal sheet to manufacture an iron core piece 12 (see FIG. 3) which forms a laminated iron core (one example of a metal product). Here, an inner configuration blanking die 13 (one example of a first die) and an outer configuration blanking die 14 (one example of a second die) respectively used in adjacent working stations which blank or stamp out an inner configuration and an outer configuration of the iron core piece 12 and having the same thickness and circular outer forms are held by a die plate 15 in a state where outer peripheral surfaces of the inner configuration blanking die 13 and the outer configuration blanking die 14 directly contact each other. A distance between a center of the inner configuration blanking the 13 and a center of the outer configuration blanking die 14 corresponds to a progressively feed pitch P of the electromagnetic steel plate 11. Keys 16, 17 are used when the inner configuration blanking die 13 and the outer configuration blanking die 14 are respectively fixed to the die plate 15. Now, the first exemplary embodiment of the present invention will be described below in detail.

As shown in FIG. 1A, there is an interfering part (an interfering area or a common area) 18 in a boundary between the outer peripheral part of the inner configuration blanking die 13 and the outer peripheral part of the outer configuration blanking die 14. Accordingly, for instance, the inner configuration blanking die 13 has a circular outer form, and the outer configuration blanking die 14 has an outer form in which a part of a circular form is cut out to a configuration along the other side outline of the interfering part 18, namely, along an outer side outline of the inner configuration blanking die 13 in the boundary between the inner configuration blanking die 13 and the outer configuration blanking die 14.

Figure 1B:
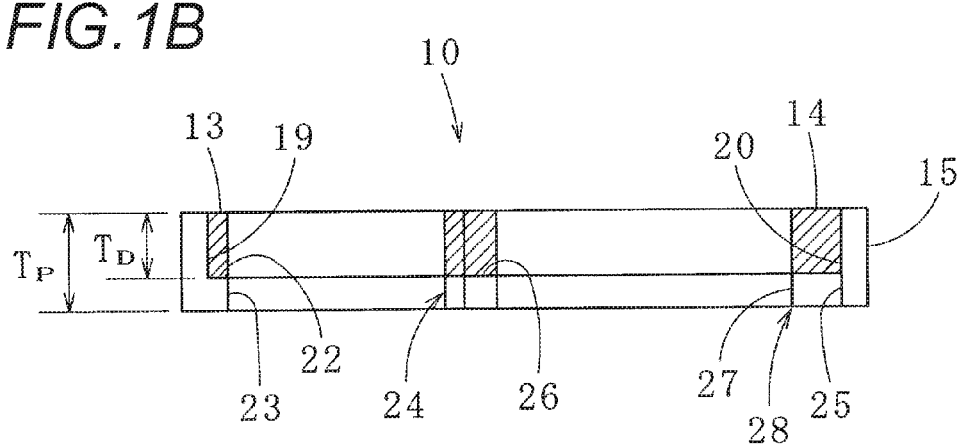
FIG. 1B is a side sectional view of the die plate shown in FIG. 1A.
Figure 2A:
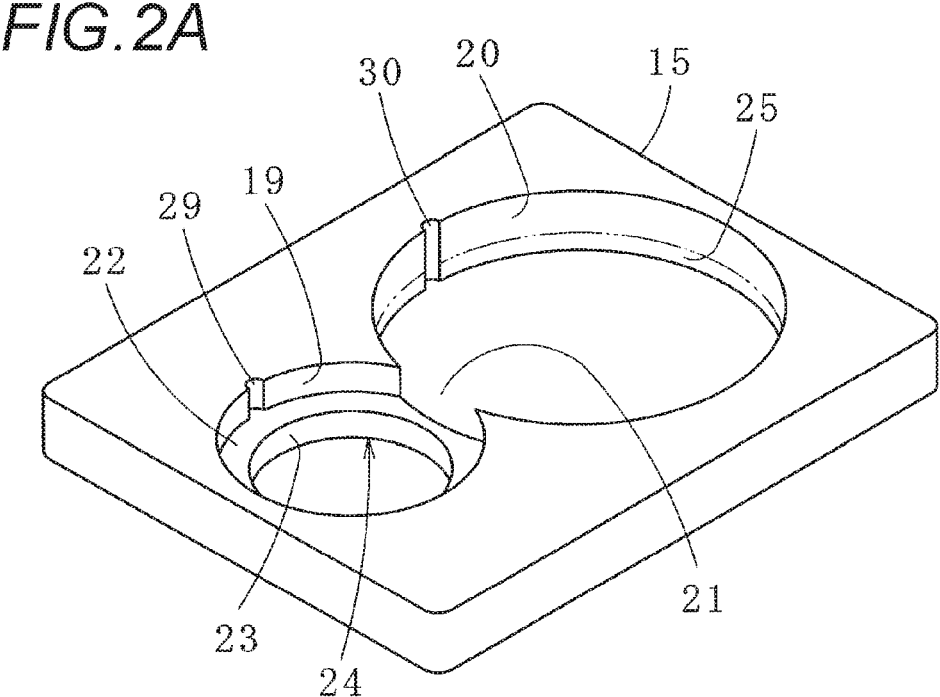
FIG. 2A is a perspective view of the die plate of the die apparatus.

Accordingly, outer peripheral surfaces of the inner configuration blanking die 13 and the outer configuration blanking die 14 directly contact each other. As shown in FIG. 1B and FIG. 2A, when a first recessed part (one example of a first receiving part) 19 circular in plan view to which the inner configuration blanking die 13 is press fitted from an upper part and a second recessed part (one example of a second receiving part) 20 circular in plan view to which the outer configuration blanking die 14 is press fitted from an upper part are provided and arranged side by side in an upper surface side of the die plate 15, the first and second recessed parts 19 and 20 are continuous through a communicating part 21 in the boundary between the inner configuration blanking die 13 and the outer configuration blanking die 14.

Figure 2B:
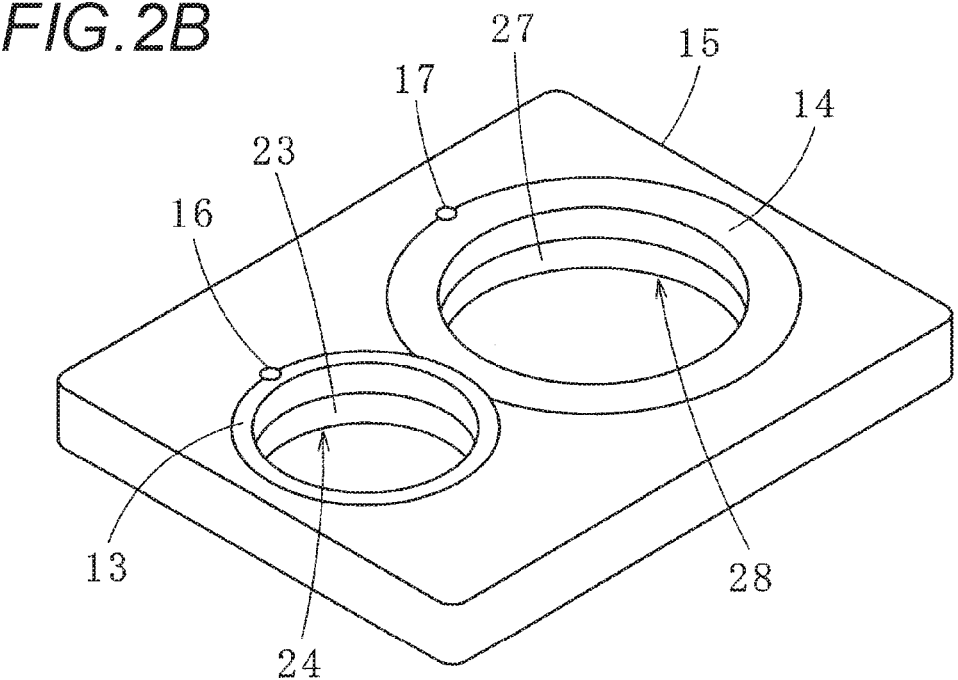
FIG. 2B is a perspective view of the die plate which holds the dies adjacent to each other under the surface-contact state.

As shown in FIG. 1B and FIGS. 2A and 2B, in a lower side of the first recessed part 19, a first ejection part 24 is provided integrally with the die plate 15. The first ejection part 24 has in a central part a scrap ejection hole 23 (one example of a first through hole) that has on an upper surface a first annular seat surface (one example of a first seat surface) 22 which abuts on and supports a lower surface of the inner configuration blanking die 13 which is press fitted to the first recessed part 19 and is continuous in a circumferential direction, and communicates with an inside space part of the inner configuration blanking die 13 which is press fitted to the first recessed part 19 to pass scraps (one example of blanked pieces) ejected from the inner configuration blanking die 13, namely, to eject the scraps outside.

As shown in FIG. 1B, and FIGS. 2A and 2B, in a lower side of the second recessed part 20, a through part 25 is provided which has the same section as that of the second recessed part 20. In the through part 25, a second ejection part 28 is detachably provided. The second ejection part 28 has in a central part a product ejection hole 27 (one example of a second through hole) that has on an upper surface a second annular seat surface (one example of a second seat surface) 26 which abuts on and supports a lower surface of the outer configuration blanking die 14 which is press fitted to the second recessed part 20 and is continuous in a circumferential direction, and communicates with an inside space part of the outer configuration blanking die 14 which is press fitted to the second recessed part 20 to pass the iron core pieces (one example of blanked pieces) ejected from the outer configuration blanking die 14, namely, to eject the iron core piece outside.

Key grooves 29, 30 into which the keys 16 and 17 are inserted are used when the inner configuration blanking die 13 and the outer configuration blanking die 14 are respectively fixed to the die plate 15.

In the above-described structure, since the first ejection part 24 is provided, integrally with the die plate 15, a part of the first ejection part 24 forms a rib between the scrap ejection hole 23 and the second ejection part 28 having the product ejection hole 27 formed, more specifically, between the scrap ejection hole 23 and the through part 25 respectively formed in the die plate 15. As a result, even when the scrap ejection hole 23 and the through part 25 are arranged and formed side by side in the die plate 15, the rigidity of the die plate 15 can be restrained from being deteriorated.

Further, as shown in FIG. 1B, a thickness $T_P$ of the die plate 15 is larger than a thickness $T_D$ of the inner configuration blanking die 13 and the outer configuration blanking die 14. For instance, the thickness $T_P$ of the die plate is supposed to be set to a thickness 1.1 to 2.5 times as large as the thickness $T_D$ of the inner configuration blanking die 13 and the outer configuration blanking die 14. Thus, the thickness of the first ejection part 24, a part of which forms the rib, can be set to be large between the scrap ejection hole 23 and the through part 25. Accordingly, the die plate 15 is prevented from being elongated in a direction of width (a direction intersecting at right angles to a segment which connects together centers of the inner configuration blanking die 13 and the outer configuration blanking die 14), so that a holding power of the inner configuration blanking die 13 and the outer configuration blanking die 14 can be prevented from being deteriorated. When the thickness $T_P$ of the die plate 15 is lower than 1.1 times as large as the thickness $T_D$ of the inner configuration blanking die 13 and the outer configuration blanking die 14, the thickness of the rib cannot be made to be large and the die plate 15 is undesirably strikingly elongated, thereby causing a deterioration of rigidity. On the other hand, when the thickness $T_P$ of the die plate 15 exceeds and is larger than a thickness 2.5 times as large as the thickness $T_D$ of the inner configuration blanking die 13 and the outer configuration blanking die 14, an elongation of the die plate 15 can be lowered (the rigidity can be improved). However, the weight of the die plate 15 is undesirably excessively large to increase a material cost of the die plate 15.

Subsequently, will be described below a manufacturing method of the iron core piece forming the laminated iron core (the one example of the metal product) (namely, the manufacturing method of the metal product according to a second exemplary embodiment of the present invention) using the die apparatus 10 according to the first exemplary embodiment of the present invention.

Figures 3A, 3B:
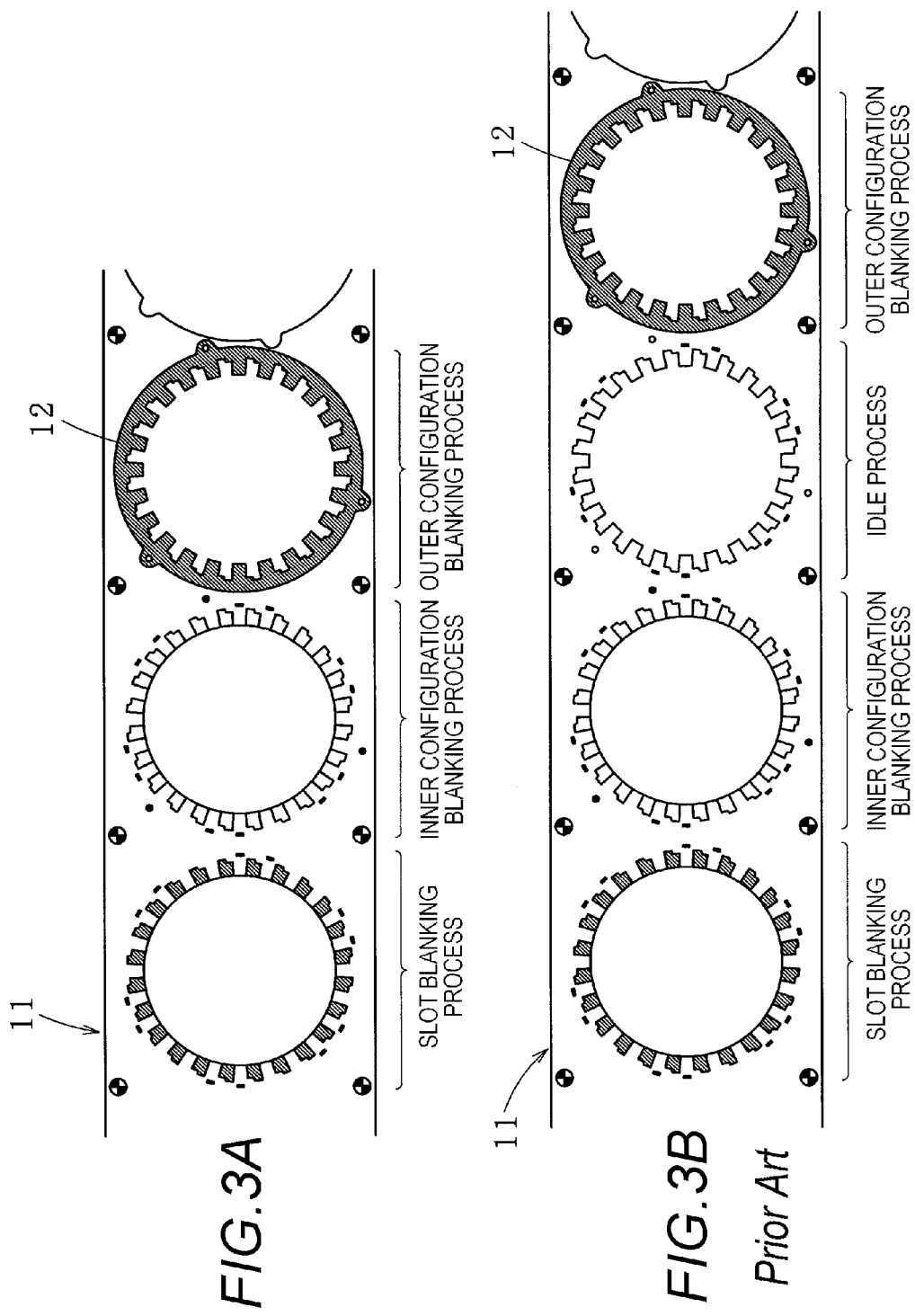
FIG. 3A is an explanatory view of a blanking process when an iron core piece is manufactured by using a manufacturing method of a metal product according to a second exemplary embodiment of the present invention.
FIG. 3B is an explanatory view of a blanking process when an iron core piece is manufactured, by using a usual manufacturing method.
Figure 4A:
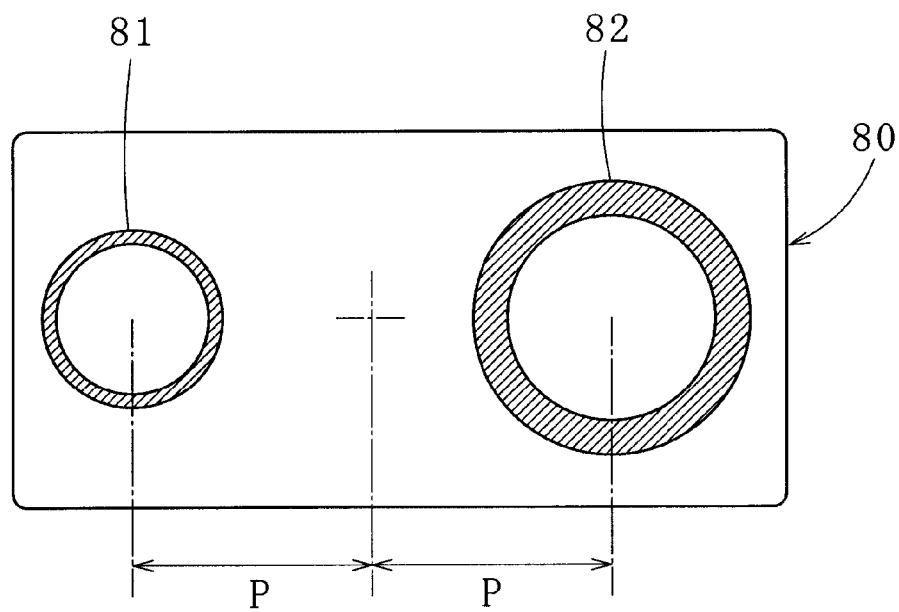
FIG. 4A is a plan view of a die plate which holds an inner configuration blanking die and an outer configuration blanking die used in a blanking process provided with an idle process between an inner configuration blanking process and an outer configuration blanking process.
Figure 4B:
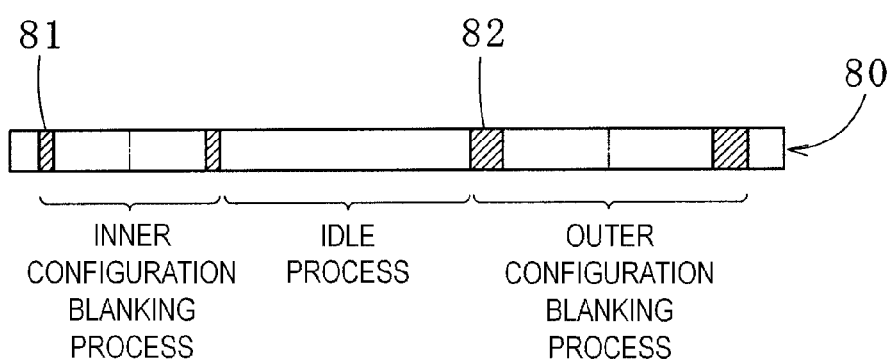
FIG. 4B is a side sectional view of the die plate shown in FIG. 4A.
Figure 5A:
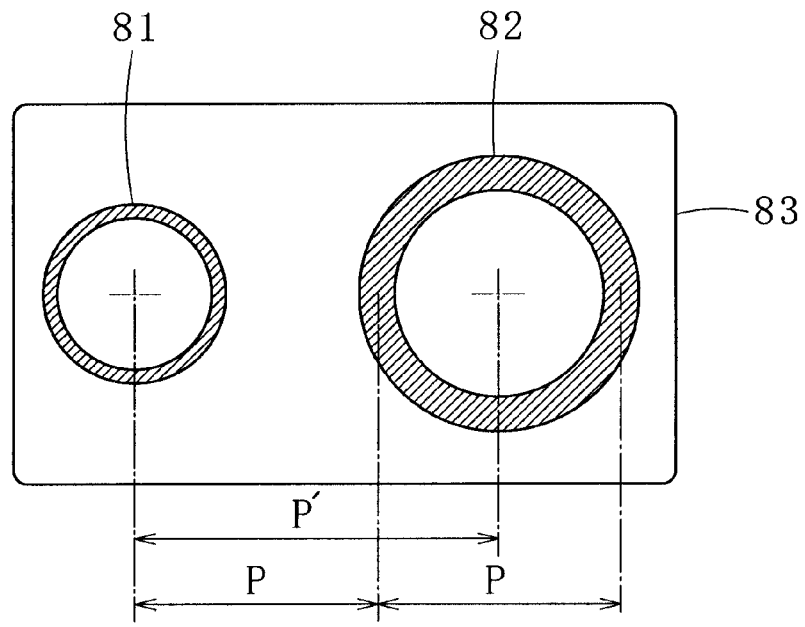
FIG. 5A is an explanatory view showing a state that an electromagnetic steel plate cannot be progressively fed when the idle process is omitted.
Figure 5B:
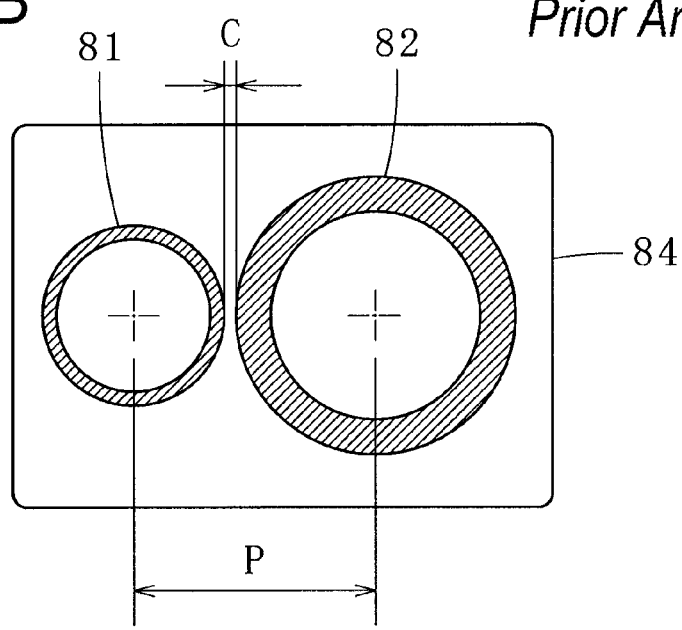
FIG. 5B is an explanatory view showing a state that the electromagnetic steel plate can be progressively fed even when the idle process is omitted.

As shown in FIG. 3A, in the die apparatus 10, when a slot blanking die used in a slot blanking or stamping process, an inner configuration blanking die used in an inner configuration blanking or stamping process and an outer configuration blanking die used in an outer configuration blanking or stamping process are arranged side by side in a direction that the electromagnetic steel plate 11 is progressively fed, as shown in FIGS. 1A and 1B, the adjacent dies, for instance, the inner configuration blanking die 13 and the outer configuration blanking die 14 can be arranged in the die plate 15 in a state where the outer peripheral surfaces of the inner configuration blanking die 13 and outer configuration blanking die 14 directly contact each other. Accordingly, the dies can be respectively arranged in order so as to correspond to the progressively feed pitch of the electromagnetic steel plate 11, and as shown in FIG. 3B, an idle process which is usually provided between the inner configuration blanking or stamping process and the outer configuration blanking or stamping process can be removed.

As a result, the blanking or stamping processes can be more shortened than usual blanking or stamping processes and a lower die of the die apparatus 10 can be miniaturized. Further, when the lower die of the die apparatus 10 is miniaturized, an upper die of the die apparatus is also miniaturized, so that a quantity of a material used to manufacture the die plate 15 which holds the dies respectively can be reduced. Thus, a production cost of the die apparatus 10 can be reduced.

Further, since the upper die of the die apparatus 10 is miniaturized, a blanking or stamping speed of a press apparatus can be improved and a productivity of the blanking or stamping process can be improved. Thus, a production speed of the iron core piece 12 can be improved, and the production cost of the laminated iron core can be reduced.

The present invention is described above by referring to the exemplary embodiments. However, the present invention is not limited to the structures described in the above-mentioned exemplary embodiments and may include other exemplary embodiments or modified examples which may be considered within a scope of matters described in claims.

Further, combinations of component elements included respectively in the exemplary embodiments of the present invention and other exemplary embodiments or modified examples may be also included in the present invention.

For instance, in the present exemplary embodiment, the first ejection part is provided integrally with the die plate to form the rib between the scrap ejection hole and the through part in which the second ejection part having the product ejection hole formed is detachably provided. Alternatively, the second ejection part may be provided integrally with the die plate. In this case, the first ejection part having the scrap ejection hole formed is supposed to be detachably provided in a through part which is provided in a lower side of the first recessed part and has the same section as that of the first recessed part. A rib is supposed to be formed between the through part and the product ejection hole provided in the center of the second ejection part. Alternatively, the first and second ejection parts may be respectively provided integrally with the die plate to form a rib between the scrap ejection hole and the product ejection hole.

Further, the scrap ejection hole (the first through hole) has the circular form in its inner peripheral side. Alternatively, the inner peripheral side of the scrap ejection hole may have a configuration corresponding to an inner peripheral configuration of an iron core piece to be manufactured, and, for instance, a non-circular configuration.

What is claimed is:

1. A die apparatus comprising:
a first die having a shape defined by a first continuously-surrounding wall and a second die having a shape defined by a second continuously-surrounding wall used in adjacent working stations that sequentially blank or stamp out a progressively fed thin metal sheet,
wherein the second die comprises a cut-out partially penetrating a wall thickness of the second continuously-surrounding wall in a radiate direction of the second die,
wherein a portion of the first continuously-surrounding wall of the first die is positioned within the cut-out of the second die such that outer peripheral surfaces of the first and second dies directly contact each other.

2. The die apparatus according to claim 1, further comprising:
a die plate which holds the first and second dies, wherein the die plate includes first and second receiving parts in which the first and second dies are respectively received, and the first and second receiving parts are continuous through a communicating part in which the first and second dies contact each other.

3. The die apparatus according to claim 2, wherein the die plate is larger in thickness than the first and second dies.

4. The die apparatus according to claim 3, wherein the first and second receiving parts of the die plate are formed as first and second recessed parts recessed in an upper surface side of the die plate,
the die plate includes first and second ejection parts in a lower surface side of the first and second recessed parts, and
the first and second ejection parts have first and second seat surfaces which abut on and support lower surfaces of the first and second dies press fitted to the first and second recessed parts, and first and second through holes formed in central parts and respectively communicated with inside space parts of the first and second dies press fitted to the first and second recessed parts to pass blanked pieces ejected from the inside space parts of the first and second dies through the first and second through holes.

5. The die apparatus according to claim 4, wherein the first ejection part is formed integrally with the die plate and a part of the first ejection part provided between the first and second through holes forms a rib of the die plate.

6. The die apparatus according to claim 5, wherein the second ejection part is detachable from the die plate and attachable in a through part having a same section as that of the second recessed part.

7. The die apparatus according to claim 4, wherein the first and second ejection parts are respectively formed integrally with the die plate, and parts of the first and second ejection parts provided between the first and second through holes form a rib of the die plate.

8. The die apparatus according to claim 4, wherein the first die is an inner configuration blanking die used in an inner configuration blanking or stamping work of an iron core piece from the thin metal sheet,
the first through hole is a scrap ejection hole through which scraps ejected from the inner configuration blanking die pass,
the second die is an outer configuration blanking die used in an outer configuration blanking or stamping work of the iron core piece from the thin metal sheet,
the second through hole is a product ejection hole through which the iron core pieces ejected from the outer configuration blanking die pass, and
the scrap ejection hole has a circular or non-circular form in its inner peripheral side.

9. A manufacturing method of a metal product using the die apparatus according to claim 1, further comprising:
progressively feeding a thin plate, which forms the metal product, at a pitch corresponding to a distance between a center of the first die and a center of the second die, and subsequently at least one of blanking and stamping the thin plate.

* * * * *